Patented Dec. 11, 1923.

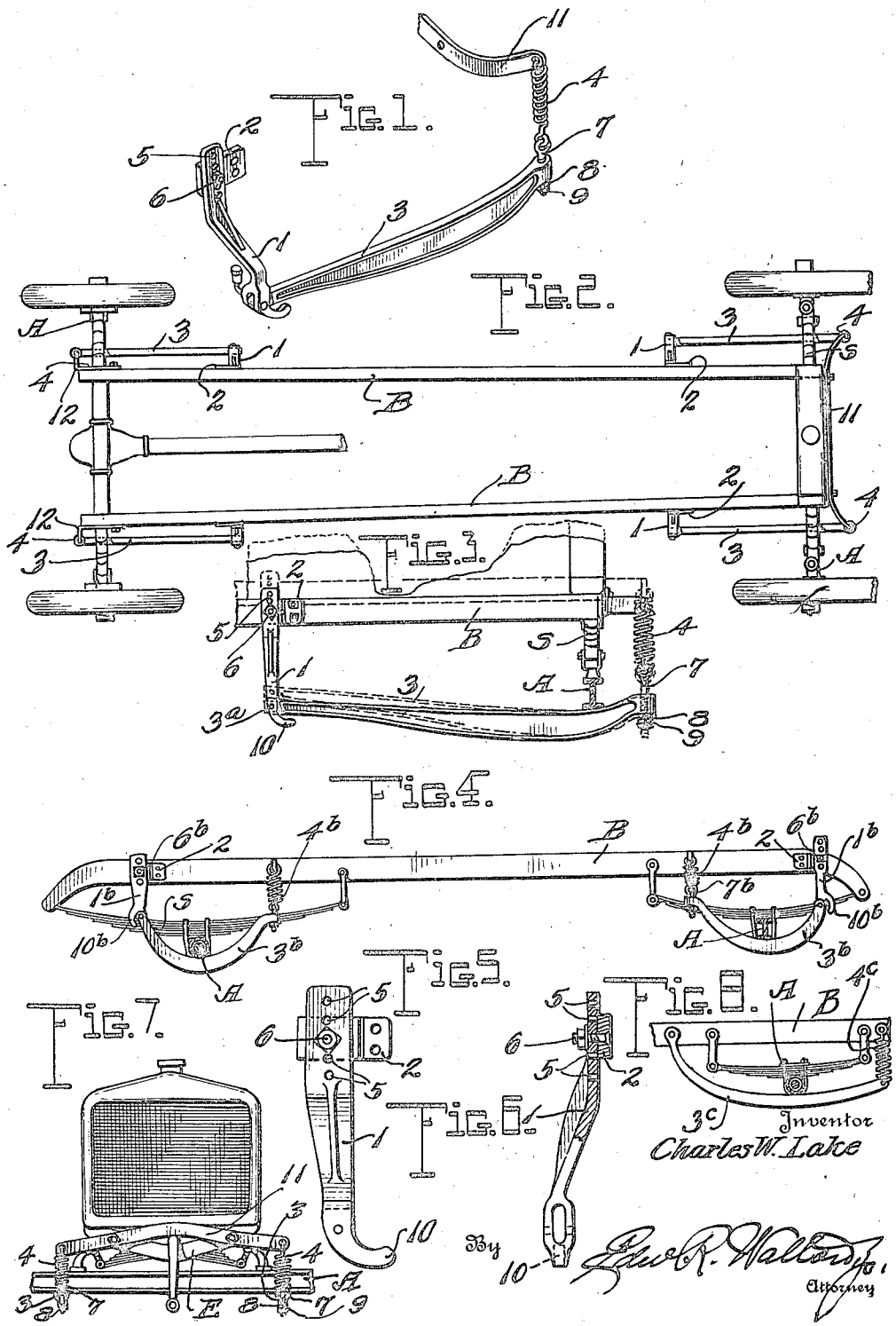

1,477,504

UNITED STATES PATENT OFFICE.

CHARLES W. LAKE, OF McPHERSON, KANSAS.

SHOCK ABSORBER.

Application filed May 1, 1922. Serial No. 557,695.

*To all whom it may concern:*

Be it known that I, CHARLES W. LAKE, a citizen of the United States, residing at McPherson, in the county of McPherson and State of Kansas, have invented a new and useful Shock Absorber, of which the following is a specification.

The present invention relates to shock absorbers, and is more particularly a rebound retarder or snubber.

The applicant is aware that attempts have been made to retard the rebound of the cushioning springs of vehicles and that devices have been devised to accomplish this purpose. The object of the present invention, however, is the production of a rebound retarder for vehicles consisting of fewer parts, thus being more economical to manufacture than those previously proposed, and which is attachable to vehicles of all makes with extreme ease and celerity without necessitating, changing, detaching or removing, any of the existing parts of vehicles, and at the same time being most efficient for its purpose and in operation.

One of the features of the present invention is that the operation of the cushioning springs, or other means, of the vehicle, due to the vehicle running over uneven surfaces or to vibrations under load, are not resisted or retarded in any way.

The invention broadly resides in a bar having one end portion pivotally connected to the frame or body of the vehicle and extened to lie under the axle, the other end portion of the bar being resiliently connected to the frame or some other stationary part of the vehicle. In practice the best results are obtained by having the bar engage the under side of the axle and slightly under tension while the cushioning means or springs of the vehicle are in their normal position, thus rendering the invention more sensitive and responsive to the slightest rebounds and eliminating rattling and knocking of loose parts, at all times.

The invention further resides in the sundry details of construction, combination and arrangement of parts which are set forth in detail in the following specification.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

In the drawings which illustrate the proved embodiments of the invention as at present devised:

Figure 1 is a perspective view of the invention unapplied to a vehicle.

Figure 2 is a plan view of a Ford chassis equipped with the invention.

Figure 3 is an enlarged detail fragmentary side view of a Ford chassis equipped with the invention.

Figure 4 is a side view of the standard automobile chassis equipped with the invention.

Figure 5 is a large detailed view of the supporting arm of the invention.

Figure 6 is an end view of the supporting arm shown in Figure 5 with portion broken away and shown in section.

Figure 7 is a fragmentary front view of Ford chassis equipped with the invention.

Figure 8 is a fragmentary detail view of a modified form of attaching the invention to an automobile frame or chassis.

Like characters denote similar and like parts throughout the specifications and drawing.

The form of the invention shown in Figure 1 is particularly adapted for Ford automobiles but can be applied and used on other types of automobiles with equal facility and giving equal results, and consists in a supporting arm 1 secured by means of a plate 2 to a side frame or other suitable part of an automobile chassis or body. The arm 1, preferably, depends from the frame downwardly to a plane substantially adjacent in horizontal plane of the axle A of the vehicle.

The lower end portion of the supporting arm 1 has pivotally secured thereto the lever 3 adapted to extend, when the device is applied, in a substantially horizontal direction and underlie the adjacent axle of the vehicle. The other end portion of the lever 3 is suitably connected to a spring 4 which is to be attached to some rigid or stationary portion of the chassis or body of the vehicle, as clearly shown in Figure 3 of the drawing.

The arm 1 preferably has an adjustable connection with the plate 2 in order that it can be raised and lowered to effect a general adjustment of the lever 3 with respect to the axle. This adjustment, in the present embodiment, is effected by having a series of vertical openings 5 in the upper end portion of the arm 1 in which may adjustably and selectively engage the stud bolt 6 extending from the plate 2. It is obvious that the plate 2 may be dispensed with in some instances and the arm secured directly to the side beams B of the chassis by means of bolt 6.

The connection of the tension spring 4 with the lever 3 is, preferably, provided by an adjustable connection; and, in the present instance, consists of threaded bolt 7 loosely extending through an opening in the distal end of the lever 3. The purpose of this adjustable connection is, that, after the absorber has been applied to the vehicle and generally adjusted by suitably positioning the arm 1 on the bolt 6, further adjustment can be made by adjusting the nut 8 and thereby produce the desired tension in the spring 4 which will maintain the lever 3 in engagement with the axle A in the normal positions of all the parts. The nut 8 may be locked in position by any suitable means and in the present instance a jam-nut 9 is provided.

In order to prevent lever 3 from falling sufficiently low to engage with the ground, in the event that the spring 4 should become broken or otherwise detached from the distal end of the bar 3, a shoulder or laterally projecting lug 10 is provided on the lower end of the arm 1 and extends forwardly in advance of the pivot 3ª. This lug or shoulder 10 forms a rest or stop upon which the bar will drop and be held out of engagement with the ground. This stop or rest 10 is positioned with the respect to the bar 3 to provide sufficient clearance there-between in order to permit the unhindered operation of the cushion springs S of the vehicle.

The invention as shown in Figures 1, 2 and 3 is particularly adapted for Ford automobiles but, as before stated, can be used in the same manner upon automobiles of other makes. It is of no importance, as far as this invention is concerned, as to whether the arm 1 or the spring 4 is positioned in front or in the back of the axle. However, in Ford automobiles where the chassis construction differs substantially from the standard chassis it is found that the best results are obtained by arranging the device in the manner shown in Figures 2 and 3 of the drawings. For use with Ford automobiles a cross bar 11 is provided to extend across the front of the frame or chassis and is secured to the end member E of the frame by suitable bolts. The ends of the bar 11 are extended outwardly from each side of the frame and are curved forwardly at their ends so that the springs 4 which are attached to said ends will be clear of the front axle.

It will be seen, therefore, that the shock absorber of this invention does not in any way hinder or prevent the free operation of the cushioning springs S caused by obstructions or unevenness in the road, and that the lever 3 will be kept into contact with the axle during the vibrating movements of the frame and the axle, but, upon all rebound movements of the springs, the frame B will assert an upward pull on the supporting arm 1 and cause the lever 3 to rock on the axle resulting in the tension spring 4 being stretched or expanded which retards or checks these rebound or upward movements of the frame, thus eliminating violent rebounding.

The shock absorber as shown in Figure 1 may be attached to each side of the frame at its front and rear ends as clearly illustrated in the drawings.

In Figure 4 of the standard form of chassis is illustrated equipped with the invention and shows a slightly modified construction, wherein the lever 3ᵇ is curved or bowed, but it is not necessary that the lever be bowed as illustrated. The advantage of curving the lever 3ᵇ permits the supporting arm 1ᵇ to be shorter in length than illustrated in Figures 1 and 3. In this form of the invention, the cross bar 11 is dispensed with.

In Figure 8 the lever 3ᶜ is shown as pivoted directly to the beam or side members B of the chassis, thus entirely eliminating the supporting arm 1.

Angular brackets 12 are also provided for use with the invention when applied to the rear axle of Ford and other automobiles where, because of their construction, it is difficult or unadvisable to attach the upper ends of the springs 4 directly to the chassis or body. One arm of the bracket 12 is secured to the beams B and the other arms have the springs 4 attached thereto.

Having thus described the invention, what is claimed as novel is:

1. A shock absorber attachment for vehicles comprising a lever adapted to be secured at one end portion to the frame of the vehicle and underlying axle of the vehicle to cushion the rebound, and a tension spring connected to the other end of said lever and adapted to be attached to the frame of the vehicle, said connection between said spring and lever being adjustable to vary the tension on said spring whereby the lever is maintained into contact with the axle.

2. A shock absorber of the kind described comprising a supporting arm to be secured to the frame of a vehicle and extend downwardly for a distance therefrom, a lever having one end portion pivotally connected to said arm and to extend in a substantially horizontal direction to underlie an axle of the vehicle, a resilient member on the other end portion of said lever adapted to be connected to said frame and to be positioned on the opposite side of said axle relative to said arm, and a stop member on said arm for limiting the downward swinging movement of said lever, whereby the latter is prevented from contacting with the ground.

3. A shock absorber of the kind described comprising a supporting arm to be secured to the frame of a vehicle and extend downwardly for a distance therefrom, a lever having one end portion pivotally connected to said arm and to extend in a substantially horizontal direction to underlie an axle of the vehicle, a tension spring having an adjustable connection with the other end portion of said lever and adapted to be attached to said frame and positioned on the opposite side of said axle relative to said arm, said arm having means whereby it may be adjusted vertically with respect to said frame.

4. A shock absorber attachment for automobiles comprising a cross bar to be secured to an end of the automobile frame and to extend transversely across the same, with the ends of the latter extending outwardly on one side of the adjacent axle, a pair of levers, one for each side of the automobile to underlie and normally engage the adjacent axle thereof between their ends, each having one end portion thereof pivotally connected to said frame at a point on the other side of said adjacent axle, resilient connections between the other ends of said levers and the corresponding end portion of said cross bar.

In testimony whereof I have hereunto set my hand.

CHARLES W. LAKE.